Dec. 19, 1967    G. GIESECKE ET AL    3,358,721
MEANS FOR JOINING WORKPIECES AT THEIR END FACES BY MEANS
OF A BONDING AGENT, MORE ESPECIALLY WORKPIECES OF WOOD
Filed Jan. 29, 1964    4 Sheets-Sheet 1

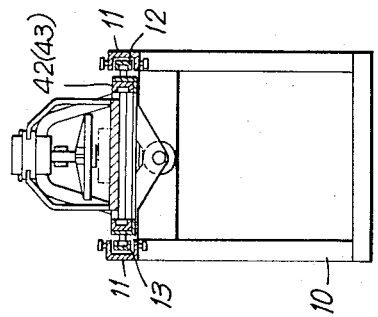
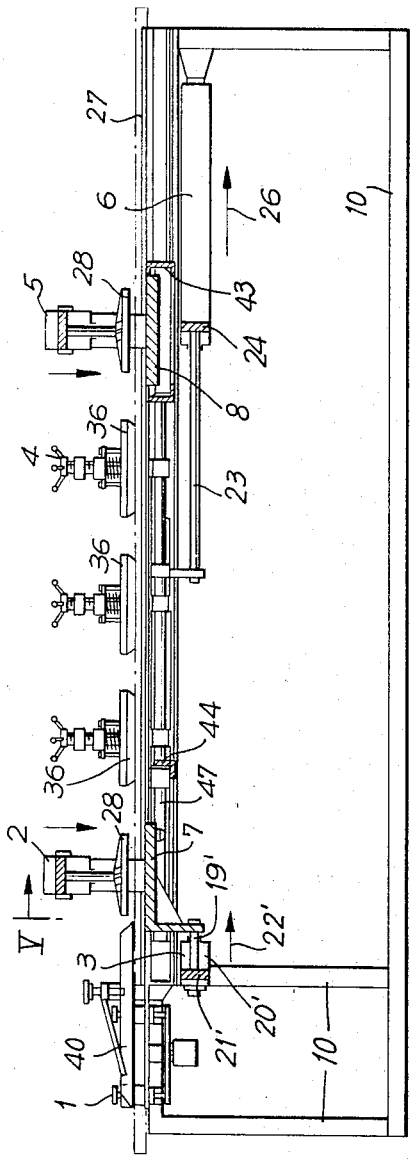
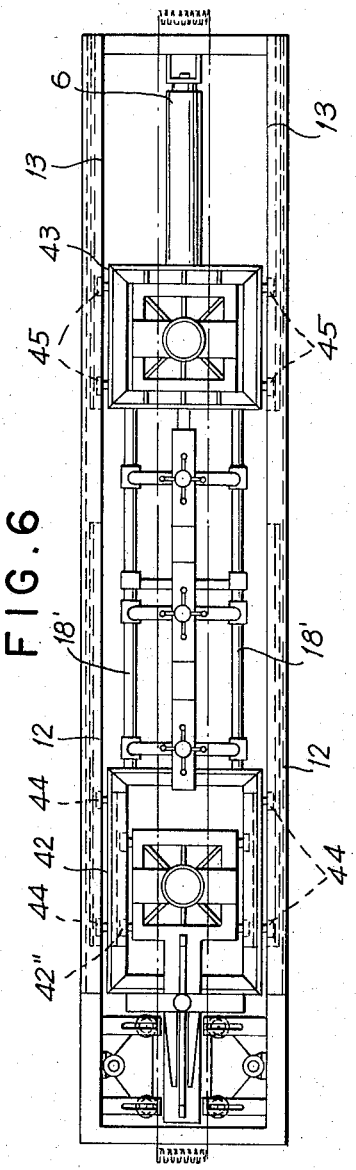

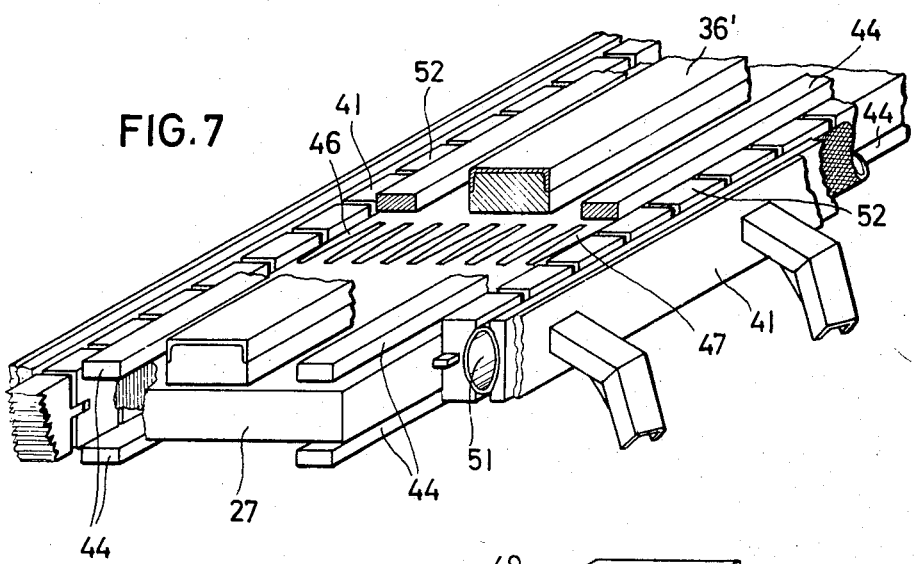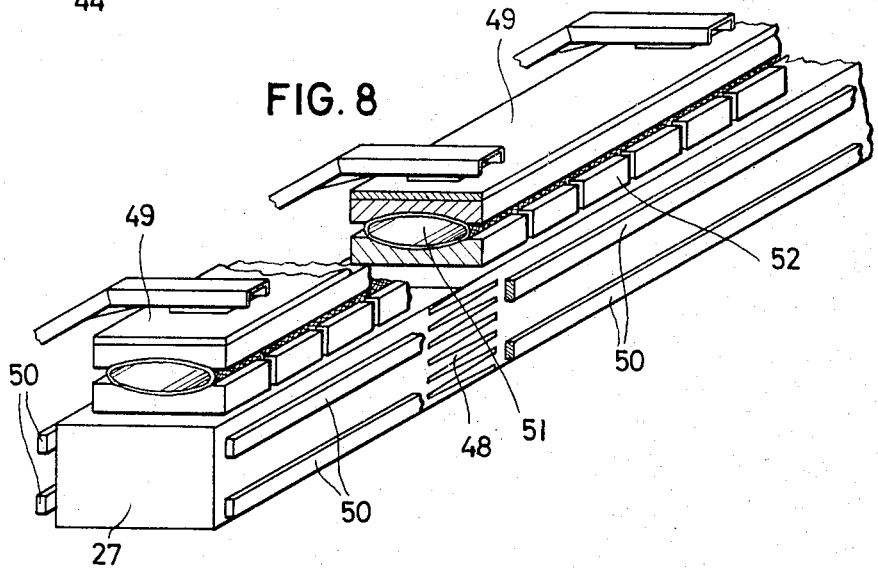

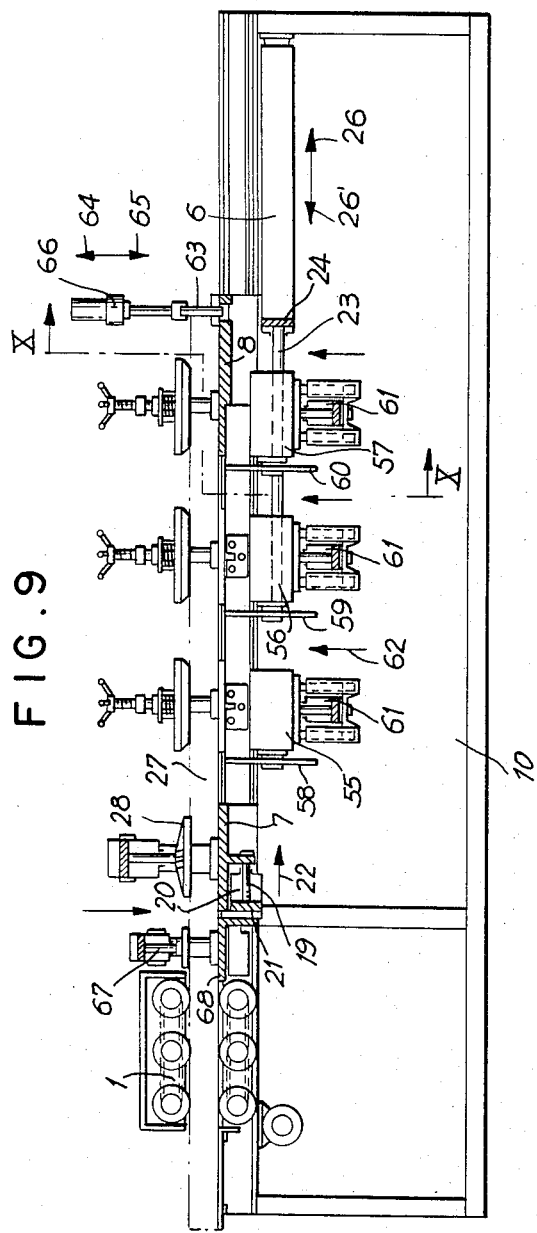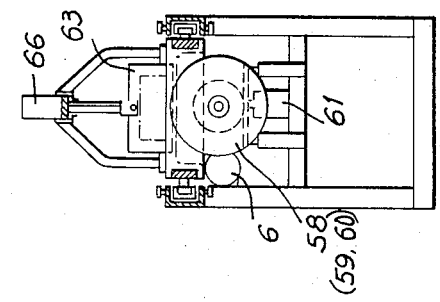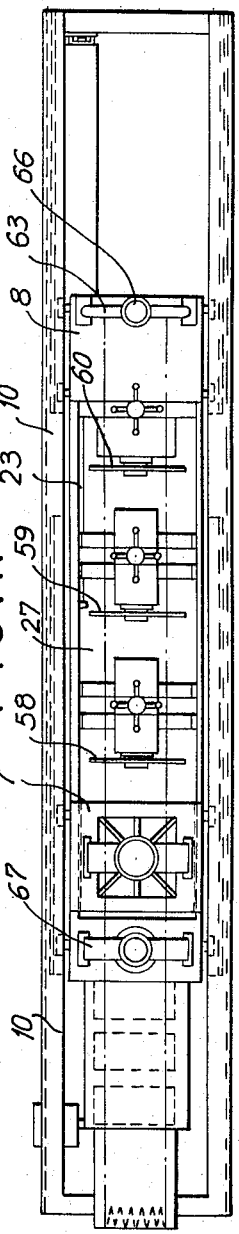

United States Patent Office 3,358,721
Patented Dec. 19, 1967

3,358,721
MEANS FOR JOINING WORKPIECES AT THEIR END FACES BY MEANS OF A BONDING AGENT, MORE ESPECIALLY WORKPIECES OF WOOD
Gunter Giesecke and Manfred Arnold, Tirschenreuth, Upper Palatinate, Germany, assignors to Gunter Giesecke, Gerhard Giesecke, Karoline Giesecke and Hermine Giesecke, trading as Hubel & Platzer, Tirschenreuth, Upper Palatinate, Germany, a partnership of Germany
Filed Jan. 29, 1964, Ser. No. 340,951
Claims priority, application Germany, Feb. 6, 1963, H 48,169; July 9, 1963, H 49,681
36 Claims. (Cl. 144—1)

The invention relates to an arrangement provided with advantageously hydraulically or pneumatically actuated pressure and feeding means and for uniting workpieces at their ends by means of a binder, more especially workpieces consisting of wood, such as planks, battens, square or round timber or boards, which are provided at their ends with interengaging profiles, as for example mortise or dovetail joints.

An apparatus of this type is known, in which supporting tables for the workpieces to be united are arranged separately from one another in the same height position and at least one of these supporting tables is connected to a hydraulic or pneumatic feed device formed for example by a pressure cylinder with piston or by a pressure pad or a pressure hose, in order to produce a movement of the tables relatively to one another. Furthermore, clamping and pressure plates are arranged on the tables above the table plane in order to secure against movement the workpieces which are placed on the tables and which are to be pressed one against the other at their ends, which plates are each provided with a hydraulic or pneumatic pressure means, likewise formed for example of a pressure cylinder with piston.

As compared with this known arrangement, in which the complete feeding movement of the workpieces, apart from the approach movement of the workpieces which is necessary for the actual union, must be stopped for carrying out each union, so that the known arrangement can always only operate with interruptions which occur for each union or connection, the object of the present invention is to provide an arrangement which is able to work without the constant interruptions while retaining the advantages of the known arrangement, more especially the possibility of producing satisfactory longitudinal pressures of the necessary value, e.g. 30 kp. for each square centimetre of wood cross-section with conifers and 40 kp. for each square centimetre of wood cross-section with deciduous wood, so that the workpieces or line of workpieces can be guided with a constant feeding movement through the apparatus.

Accordingly, the essential features of the invention consist in that the supporting tables are arranged to be jointly movable in a forward direction by means of guideways with an adjustable longitudinal spacing from one another by a predetermined amount with the workpieces which are steadily advancing and, during this displacement, are movable relatively towards one another by reducing the spacing of the tables from one another. The spacing of the rear table from the front table which is constantly being moved forwards is advantageously capable of being reduced.

One particularly expedient embodiment of the arrangement is provided if pressure clamping plates as known per se are arranged on the tables for the common forward movement of the tables with the workpieces or a line of workpieces formed by a loose succession of the latter, the said workpieces or the said line being steadily moved forwardly by a feed device, which clamping plates are adapted to be pressed on to the line of workpieces and, in their pressing position, are adapted to be driven by said line in its forward movement, including the tables which are connected therewith.

The construction is advantageously such that for carrying out the relative movement of the tables which takes place during the common forward movement of said tables, an individual feed device which is known per se and which is actuated by a pressure medium or mechanically and/or electrically acts on one or both tables, preferably on the rear table.

With an arrangement constructed in this way, the possibility is provided by simple means for the longitudinal pressures necessary for the union to be satisfactorily produced with the value specifically required during the continuous forward movement of the workpieces or line of workpieces, without the uniform forward or feeding movement of the line of workpieces having to be interrupted for this purpose. Consequently, a high working speed can also be achieved with a large output. The relative longitudinal spacing of the tables can be adjustable in simple manner, so that, between the tables, with corresponding shortness of the workpieces to be united, a plurality of connecting points can be pressed together in one working operation with an always equal bearing pressure. The line of workpieces can be supported between the tables by workpiece supports which are movable with the tables.

Although the pressing operation takes place during the continuous feeding of the workpieces, the latter, while they are pressed one against the other, are held immovable with respect to the tables, so that there is no displacement of the workpieces on the tables.

By means of the invention, there is furthermore provided in simple manner the possibility of using, for example with mortise joints, additional pressure members which are operative transversely of the mortise joint surfaces and serve more especially for applying pressure to the marginal tenons which have a tendency to split when a longitudinal pressure is applied. In conjunction with such additonal pressure-applying members, which are carried along by the tables with the common feeding movement of the latter, it is also possible to provide longitudinal electrodes which are likewise driven and which are connected to a high-frequency generator, so that with the arrangement according to the invention, a high-frequency heating means which is known per se can also be used in simple manner for the complete or only partial hardening of the binder used at the connecting points or for the end welding of for example workpieces which consist of plastic, it also being possible for the said heating means to extend over several connecting points. By this means, the working speed can be increased still further, for example, due to the shortening of the setting times. It is also readily possible for the arrangement with additional pressure-applying members and such a heating means to be used for horizontal dovetail joints, in which the mean planes of the tenons extend parallel to the surface of the board.

The construction can moreover advantageously be such that at least one saw operating transversely of the line of workpieces is arranged between the supporting tables, the said saw participating in the common feeding movement of the tables and, after shutting off the longitudinal bearing pressure, being moved during its common feeding movement with the tables into the path of movement of the line of workpieces and, after making a suitable cut, being movable back again into its initial positon. In this way, the line of workpieces which are united on the apparatus, immediately on completion of the pressing operation necessary for uniting the workpieces and produced by the relative movement of the tables, can be cut or shortened by saws to required lengths during the common forward movement of the two tables by the continuously advanced line of workpieces, so that the provision of a separate saw device after the arrangement becomes superfluous.

The invention is hereinafter described by reference to the constructional forms which are shown by way of example in the drawing, wherein:

FIG. 4 is a longitudinal section through a second embodiment of the arrangement;

FIG. 5 is a cross-section on the line V—V of FIG. 4;

FIG. 6 is a plan view of FIG. 1;

FIG. 7 is a perspective view of a part of the arrangement with additional pressure-applying members for unions or connections with vertically disposed mortise joints;

FIG. 8 is a view corresponding to FIG. 7 for connections wth horizontally disposed mortise joints;

FIG. 9 is a longitudial through an embodiment of the arrangement which is provided with a saw;

FIG. 10 is a cross-section on the line X—X of FIG. 9, and

FIG. 11 is a plan view of FIG. 9.

Figure 2:
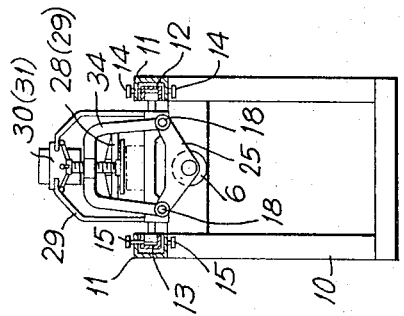
FIG. 2 is a cross-section on the line II—II of FIG. 1.
Figure 1:
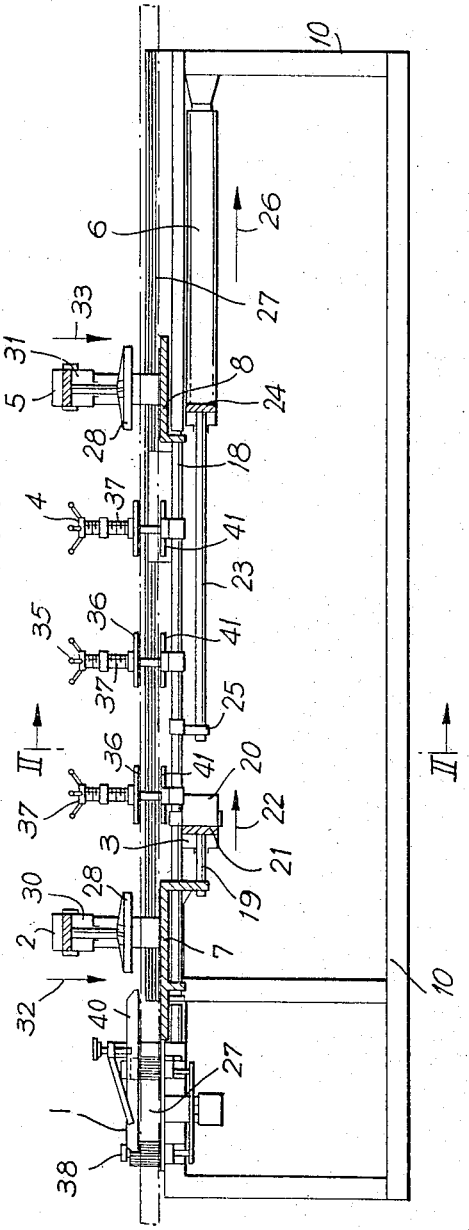
FIG. 1 is a longitudinal section through a first embodiment of the arrangement.
Figure 3:
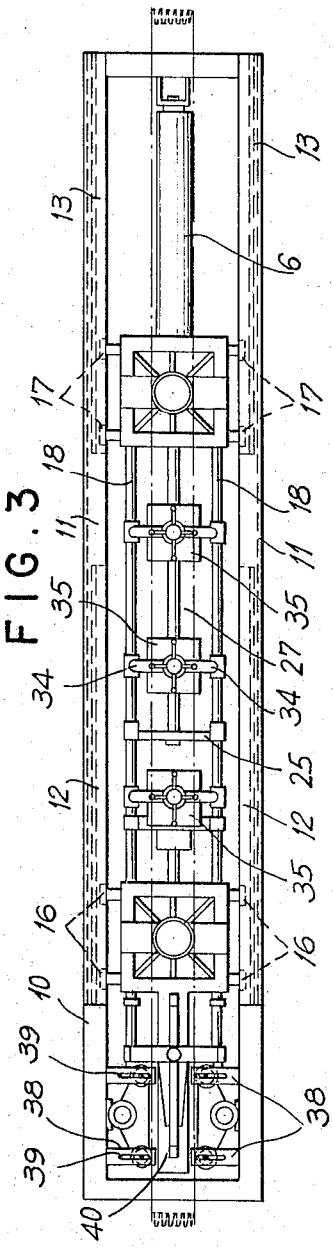
FIG. 3 is a plan view of FIG. 1.

According to FIGS. 1 to 3, upper U-shaped guide rails 11 are arranged on each side of a frame 10, which rails extend substantially the entire length of the frame 10 and in each of which are arranged two shorter and likewise U-shaped guide rails 12, 13 spaced longitudinally from one another. The longitudinal spacing of the rails 12 and 13 from one another can be altered by longitudinal displacement of the said rails in the rails 11 and can be secured in position, for example by means of screws 14, 15. Mounted for free displacement by means of the rollers 16 in the rails 12 is a supporting table 7, while another supporting table 8 is also freely displaceable by means of the rollers 17 in the rails 13. Fixed on the table 8 are two lateral guide rods 18, on which the other table 7 is arranged to be displaceable, so that the tables are movable relatively to one another. For carrying out this relative movement, the piston rod 19 of a hydraulic or pneumatic arrangement formed by a cylinder 20 with a piston 21 operates on the table 7, the said cylinder 20 being fixed to the guide rods 18. When pressure medium is supplied to the cylinder 20 for the purpose of displacing the piston 21 in the direction of the arrow indicated at 22 in FIG. 1, the tables 7 and 8 are brought closer to one another in the guide rails 11, independently of their position in the guide rails 12, 13 and independently of the mutual longitudinal adjustment of these latter rails. The piston rod 23 of a hydraulic or pneumatic arrangement formed by a cylinder 6 with a piston 24 is also fixed to the guide rods 18 by means of a stirrup member 25, the cylinder being arranged on the frame 10. When pressure medium is fed into the cylinder 6 in the sense of displacing the piston 24 in the direction of the arrow indicated at 26 in FIG. 1, the tables 7 and 8 are jointly displaced in the direction of the arrow 26 in their guide rails 12 and 13 without changing their mutual spacing, while they are returned to their initial positon when the piston 24 is displaced in the opposite direction 26'.

A pressure-clamping plate 28 is arranged on each of the tables 7 and 8 serving for the positioning of the workpieces or the line of workpieces 27, which plates can be forced downwardly in the direction of the arrows 32, 33 onto the line of workpieces 27 resting on the tables by means of the pressure-actuated devices 30 and 31 which are for example secured by means of the bowed member 29, and thus at least two workpieces are secured on the tables so as to be immovable. In addition, several retaining devices are arranged by means of bowed members 34 on the guide rods 18 between the tables 7 and 8, the retaining plates 36 being adjustable in height by means of the manually rotatable screw spindles 37. In addition, plates 41 which offer supporting surfaces to the workpieces or the line of workpieces between the tables 7 and 8 are arranged underneath the plates 36. Such supporting surfaces which are movable with the tables can also be arranged behind the table 8.

Arranged at that end of the frame 10 which is left free of the guide rails 11 is a feed device 1 which can be constantly driven and which is provided with four feed rollers 38 having a vertical axis of rotation and operative in pairs on each side of the line of workpieces 27. The feed rollers 38 are adjustable relatively to one another in slotted guideways 39 in relation to the width of the workpiece. By means of this feeding device, the line of workpieces 27 is constantly moved in the direction of the arrows 22 and 26 through the arrangement when the latter is in operation. An elongated device 40 for holding down or retaining the workpiece can also be arranged in the region of the feed device 1, the said retainer device being fixed on the table 7 and likewise being capable of adjustment to conform to the height or thickness of the workpieces.

As can be seen from FIG. 7, the retaining devices 35 can also be provided between the tables with elongated retainer plates 36', e.g. in the form of covered bars. In addition, transverse pressure elements 41 can be provided, these advantageously being constructed as sectional pressure beams and likewise being moved with the tables.

For gluing boards, planks or other workpieces 27 which, according to FIGS. 7 and 8, are for example formed at their ends with vertical or horizontal mortises and tenons, these workpieces are loosely assembled and supplied in the form of a line of workpieces, advantageously by means of a supply table of the feed device 1 disposed in front of the arrangement. The said workpieces are then gripped by the suitably adjusted rollers 38 of the feed device and advanced with a constant feeding speed. The pressure-clamping plates 29 initially assume their raised position as indicated in FIG. 1, but as soon as one of the connecting points 42 (FIG. 7) with long workpieces or several of such connecting points with short workpieces are located between the tables, they are actuated by a control means (not shown) operating in dependence on travel or time, by the supply of a pressure medium to their actuating dveices 30, 31, so that the plates are pressed tightly onto the line of workpieces moved forwardly by the feed device 1. Since the pressure-clamping plates 28 are fixed on the tables 7 and 8 which are displaceable in their guide rails 12, 13, they are also driven by the advancing line of workpieces 27. The force expended for this purpose can be kept low, by applying pressure medium to the device 6, 24 just before the plates 28 are pressed on to the workpieces, for the purpose of displacing the piston 24 and thus the tables 7, 8 in a forward direction. By this means, and by the feeding movement of the line of workpieces, the tables 7, 8 and by these also the guide rods 18 with the retainer devices 35 and the supporting plates 41 are moved forward. During this common feeding movement of the tables, pressure medium is admitted to the cylinder 20 moving forward with the tables by means of the control means already referred to or even by an additional control means, in such a way that the piston 21 guided in the said cylinder is displaced in the direction of the arrow 22. As a result, with constant general feeding movement of the tables and the components which are arranged thereon, the table 7 is additionally displaced in the direction of the arrow 22, so that its longitudinal spacing relatively to the table 8 is reduced. Since the line of workpieces is held by the pressure-clamping plates 28 so as to be immovable on the tables 7 and 8, the length of the said line between the tables is also shortened, whereby the separate workpieces of the line are pushed tightly one within the other at their ends with the applied pressure necessary for the gluing operation. The general feeding movement of the tables is not interrupted at this time, since the feeding device 1 is constantly driven.

When the applied pressure has reached its maximum value, which pressure can vary with workpieces of different types and, for example, as regards wood, can be dependent on the type, structure, moisture and cross-section of the wood and the pretension of the joints, the actuating means 30, 31 for the pressure-clamping plates 28 are so controlled by a control means which is dependent on pressure, travel or time and which accordingly is adjustable to the applied pressure to be reached, that the connection of these plates with the line of workpieces is released, by the plates being lifted from the said line. By the same control arrangement, pressure medium can be admitted to the cylinder 6 so that the piston 25 of said cylinder, which has been displaced with the tables in the direction of the arrow, because of the connection of its piston rod 23 to the guide rods 18, is now moved in the opposite direction, whereby the tables 7, 8 with all parts which are arranged thereon are again returned to the starting position shown in FIGS. 1 and 2.

The transverse pressure elements 41 can be actuated jointly with the pressure-clamping plates 28 in order to produce an additional transverse pressure on those marginal tenons or other marginal parts, e.g. overlaps, which have a tendency to open up.

The embodiment of the arrangement which is shown in FIGS. 4 to 6 differs from that according to FIGS. 1 to 3 essentially by the tables 7, 8 being arranged in frames 42 and 43, respectively, which in their turn are displaceable in the guide rails 12, 13 of the frame 10 by means of rollers 44, 45. In this case, the table 7 is still arranged to be displaceable within its frame. According to FIGS. 5 and 6, the frame 42 is for this purpose provided with guide rails 42', in which are guided the rollers 42'' fixed on the table 7. The table 7 is connected in a manner similar to that indicated in FIGS. 1 to 3 and by means of the piston rod 19' to a piston 21' guided in the cylinder 20'. The frames 42 and 43 are in this case rigidly interconnected by the rods 18', so that when the pressure-clamping plates 21 are pressed onto the line of workpieces 27, they are both jointly driven with the feeding movement of the line of workpieces without thereby changing their relative longitudinal spacing. The rods 18' which are in this case also moved again have fixed thereon retaining members 25 and also the piston rod 23 of the piston 24 guided in the cylinder 6.

The arrangement is operated in the same manner as in the constructional form according to FIGS. 1 to 3, only with the difference that in order to produce the bearing pressure, the table 7 is displaced by the means 20', 21' relatively to its frame 42, which is moved forwardly jointly with the frame 43 of the table 8.

As indicated diagrammatically in FIGS. 7 and 8, the arrangement according to the invention can also be provided in a manner known per se with a heating means which produces the complete or partial hardening of the binder disposed at the connecting points and in this way contributes to the arrangement being adapted to be operated with a higher feeding speed. For this purpose, longitudinal electrodes 44 can be connected fast to the tables 7 and 8 or, with the constructional form according to FIGS. 4 to 6, to the frames 42, 43 supporting the tables, the said electrodes being connected to a high-frequency generator (not shown) and producing a high-frequency field which extends through the connecting point or points and which causes the hardening. FIG. 7 shows the use of such a heating means for the production of unions or connections with vertical joints 45 in association with the previously mentioned transverse pressure members 41, which consist on the inside of individual members and apply pressure to the marginal tenons 46 and 47 of the illustrated connection in a transverse direction. The high-frequency heating means can be actuated by the control arrangement at intervals corresponding to the actuation of the pressure-clamping plates 28 and the transverse pressure-applying members 41, the said control arrangement also controlling the supply of pressure medium for the pressure-clamping plates and the transverse pressure-applying elements. The high-frequency heating means can more especially also be used when the arrangement serves for connecting workpieces consisting of a material other than wood, e.g. plastic workpieces, which are welded to one another by using an additional binder, but even also without such a binder, and with which possibly the transverse pressure-applying members are superfluous.

FIG. 8 shows the use of such a high-frequency heating means for the condition or union of workpieces 27 with horizontal mortise joints 48. The sectional pressure beams 49 which in this case bear on the top side of the workpiece can be supplemented on the underside by cooperating pressure beams (not shown) and for example, in the constructional form of the arrangement as shown in FIGS. 1 to 3, be arranged together with the latter between the retainer devices 35 or supporting plates 36, rigidly connected to the tables 7, 8. The longitudinal electrodes 50 are then arranged on both sides of the workpieces or line of workpieces 27.

The constructional forms which have been described can be modified in many respects. More especially, it is for example possible to control by means of a time switch or a time relay the releasing of the pressure-clamping plates 28, and also the releasing of one or more pressure members, e.g. of one or more transverse pressure-applying elements 41, the restoring of the original table spacing after the pressing operation, the returning of both tables 7, 8 with the associated bearing surfaces for the workpieces and retaining means, also the transverse pressure-applying elements 41 or the pressure members 49, into their initial position, depending on the required degree of setting of the binder which is used or on the time necessary for a satisfactory welding.

The constructional form shown in FIGS. 8 to 10 corresponds in its design substantially to the constructional form according to FIGS. 1 to 3. In this case, however, at least one cross-cut saw is arranged in conjunction with the second movable table 8 or between the tables 7 and 8, which saw is adjustable longitudinally of the arrangement or can also be fixedly arranged and being movable inwardly and out again with its saw blade into the path of movement of the line of workpieces 27. In the example illustrated, there cross-cut saws constructed as circular saws 55, 56, 57 with the saw blades 58, 59, 60 are provided, the said saws being adapted to be raised by a pressure medium in the direction of the arrow 62 by means of the piston and cylinder arrangements 61 and conversely to to be lowered again.

In addition, a stop 63 is arranged on the rear movable table 8 instead of a device corresponding to the pressure-clamping plate 28, said stop serving as an abutment for the line of work-pieces 27 and retaining the same, so that the longitudinal pressure of the individual feed device 19, 20, 21 can become operative for gluing the workpieces. The stop 63 is adapted to be raised and lowered in the direction of the arrows 64, 65 by means of the piston and cylinder device 66. Finally, with the constructional form illustrated, a workpiece-clamping device 67 can be arranged on the fixed part 68 of the arrangement, which device can be fixedly mounted on the said part, but also being adapted to be moved forwardly and rearwardly with the movable table 7.

When the arrangement is further developed in the manner disclosed, it is possible to make cuts through the continuously advanced line of workpieces 27 within the pressure zone and immediately after the pressing operation, that is to say, after the relative movement of the two tables 7 and 8 towards one another, and during the common main feeding movement of the two tables, thereby dividing the length of workpieces into component lengths. The construction is such that immediately after applying the longitudinal pressure by the individual feed device 19, 20, 21, the pressure-clamping plate 28 of the front table 7 is released, whereby the line of workpieces is relieved of the longitudinal pressure acting in the feeding direction. At the same time, the workpiece-clamping device 67 is actuated. The effect of this procedure is to avoid either the longitudinal pressure or even the pressure applied by the feeding assembly in the feeding direction from having an unfavorable influence on the blades 58, 59, 60 of the transverse circular saws. In the event that no additional workpiece-clamping device 67 is provided, the control of the pressure-clamping plate 28 and of the separate feed device 19, 20, 21 takes place in such a way that the pressure-clamping plate 28 remains clamped on the workpiece even after carrying out the longitudinal pressing operation, while the separate feed device remains in its end position when the pressure is relieved, so that the cutting or sawing operations can be carried out. The pressure-clamping plate 28 can then be released and the separate feed device 19, 20, 21 can be brought into its initial position, while simultaneously the complete carriage (both tables 7 and 8) is returned to the starting position by corresponding displacement of the piston 24 in the cylinder 6 by means of the piston rod 23.

As already mentioned, the vertical workpiece-clamping device 67, instead of being fixed, as shown in the drawing, can also be so arranged that it participates in the relative movement of the table 7. In this case, it is actuated together with the pressure-clamping plate 28. For relieving the pressure in the end position of the pressure cylinder serving for the relative movement, it is then sufficient to release the pressure-clamping plate 28, while the clamping device 67 remains clamped and the separate feed device 19, 20, 21 is locked in its end position.

Due to the fact that it is possible according to the invention to carry out cutting or sawing operations during the feeding of the two tables 7, 8 in addition to the longitudinal compressing, the time factor and also the path of travel for the two tables is greater than with the arrangement according to FIGS. 1 to 3, Consequently, the spacing of the feed device 1 from the front table 7 is chosen to be correspondingly large in order to be able to fit workpiece supports and retainers (not shown) which can be displaced one within the other and which guarantee a satisfactory and effective guiding of the line of workpieces. Instead of this arrangement, however, it is also possible to use guideways which are guided through the feed device 1, or the feed device 1 can be so constructed that it acts on the narrow side of the workpiece.

The control of the arrangement can in this case be effected in various ways. One preferred working procedure is obtained if pressure medium is fed into the cylinder 6 in the position of the piston as shown in FIG. 9 and with the pressure plate 28 released, before the line of workpieces 27 constantly advanced by the continuous feed means reaches the stop 63 at the leading end, the feed being effected by means of a limit switch or a light barrier, so that all displaceable parts of the arrangement, i.e. both the tables 7 and 8, including all accessories, such as pressure plate 28, workpiece retainers and circular saws 55, 56, 57 are set in movement in the direction of the arrow 26. When the front end of the line of workpieces reaches the stop 63 the pressure plate 28 is clamped on the workpiece, and the separate feed device 19, 20 21 becomes operative. By this means, all mortise joints disposed between the pressure plate 28 and the stop are pushed one within the other under a high longitudinal pressure. The table supports, retainer devices and lateral guideways, which are merely interrupted at the positions of the saws, ensure that a straight workpiece is formed which is flush on the supported side. When the pressing operation has ended (the control of this can be effected in dependence on pressure or time), the workpiece-clamping device 67 is actuated, while simultaneously the pressure 28 is released from the workpiece and the separate feed device 19, 20, 21 returns to its end position. As soon as the pressure plate of the workpiece-clamping device 67 bears tightly on the workpiece, the interposed cross-cut saws 55, 56, 57 are lifted by the devices 61 and quickly and easily cut the workpieces relieved of longitudinal pressure into the required component lengths or sections. After completing the cuts, the cross-cut saws slide back into their initial position; the stop 63 is shifted upwardly by the device 66 and the workpiece-clamping device 67 is released, whereupon the cylinder 6 or the piston rod 23 brings the tables 7 and 8 in the direction of the arrow 26' back to their starting position. By this means, the line of workpieces split up into component lengths are advanced by the feed device 1 beneath the stop 63. An extraction device ensures that the sections are quickly discharged in the feeding direction. When this has taken place, the stop 63 again slides downwardly into its starting position and a fresh operating cycle can commence. The arrangement can at will also be so designed that the stop 63 is rigid in a vertical direction and the workpieces are ejected laterally.

Instead of the stop 63, it is also possible to use a retaining device which corresponds to the pressure-clamping plate 28 and which is to be actuated in the same manner as the stop 63.

What is claimed is:

1. Apparatus for uniting workpieces at their ends by means of a binder, in which the said workpieces rest on relatively movable supporting tables at the same height level and are moved relatively to one another for carrying out the connection and the bearing pressure necessary for this purpose, said supporting tables being arranged to be jointly movable in a forward direction by means of guideways in an adjustable longitudinal spacing from one another by a predetermined amount with the workpieces which are steadily advancing and means for moving the tables relatively towards one another during this displacement by reducing the spacing of the tables from one another.

2. Apparatus according to claim 1, comprising pressure clamping plates arranged on the tables for the common forward movement of the tables with the workpieces, said workpieces being steadily moved forward by a feed device, said clamping plates being adapted to be pressed onto the workpieces and, in their pressing position, are adapted to be driven by said workpieces in the forward movement of the workpieces and thereby drive the tables which are connected therewith.

3. Apparatus according to claim 1, wherein said means for relatively moving the tables comprises a separate feed device acting on at least one of said tables for effecting the relative movement of the tables towards one another, which movement takes place during the common forward movement of the tables.

4. Apparatus according to claim 3, comprising workpiece supports and retainers, which are operative in any position of the table, are arranged between the tables and before and after the tables.

5. Apparatus according to claim 4, wherein the workpiece supports and retainers are capable of being displaced jointly with the tables.

6. Apparatus according to claim 1, wherein the guideways serving for the movement of the tables are arranged to be adjustable in guide rails of a frame.

7. Apparatus according to claim 1, wherein the tables are mounted directly in the guideways so as to be longitudinally displaceable.

8. Apparatus according to claim 3, wherein one supporting table has fixed thereon connecting rods which extend towards the other table, by means of which rods the tables are connected so as to be displaceable relatively to one another by means of the separate feed device which is fixed to the connecting rods.

9. Apparatus according to claim 1, wherein at least one table is arranged in a frame displaceable longitudinally in the guideways and is displaceable relatively to the said frame in guideways of the latter.

10. Apparatus according to claim 9, wherein said one table is arranged in a frame which is displaceable with the table in the guideways.

11. Apparatus according to claim 9, wherein the frame is connected fast to another frame by connecting rods.

12. Apparatus according to claim 9, wherein the tables are arranged to be movable longitudinally within the frame so that the mutual spacing of the tables is adapted to be reduced during the movement of the frames in the guideways.

13. Apparatus according to claim 8, comprising workpiece supports and the workpiece retainers fixed to the connecting rods.

14. Apparatus according to claim 1, comprising a device for restoring the tables to their initial position after applying the pressing pressure.

15. Apparatus according to claim 13, wherein the device consists of a pressure cylinder fixed on the frame of the arrangement and a piston which is guided in said cylinder, the piston having a rod for operating on the connecting rods.

16. Apparatus according to claim 2, for connecting workpieces which interengage at their ends with overlaps comprising additional pressure members which are operative transversely of the overlapping surfaces and which are movable with the tables.

17. Apparatus according to claim 16, wherein the additional pressure members consist of sectional beams which are adapted to be applied under pressure by means of pressure pads.

18. Apparatus according to claim 15, comprising heating means which are movable with the tables, the said heating means serving for the hardening of the binder used at the connecting points of the workpieces.

19. Apparatus according to claim 18, wherein said heating means comprises electrodes which are connected to a high-frequency generator, said electrode extending longitudinally and being movable with the tables.

20. Apparatus according to claim 16, comprising control means for the actual applied pressure of the pressure-clamping plates, the said means being selectively dependent on travel and time.

21. Apparatus according to claim 20, wherein the means for controlling the applied pressure of the pressure-clamping plates also controls the application of the additional pressure members and the switching on of the heating means.

22. Apparatus according to claim 21, wherein the means controlling the application of pressure by the pressure-clamping plates also controls the actuation of the device for returning the tables.

23. Apparatus according to claim 16, comprising control means which is dependent on pressure, and which controls the lifting of the pressure-clamping plates after reaching a prescribed bearing pressure.

24. Apparatus according to claim 23, wherein the device controlling the lifting of the pressure-clamping plates also controls the actual lifting of the additional pressure-applying members.

25. Apparatus according to claim 24, wherein the device controlling the lifting of the pressure-clamping plates also serves to control the separate feed device of the rear table to restore the tables to their original spacing.

26. Apparatus according to claim 23, wherein the device controlling the lifting of the pressure-clamping plates also serves to control the device for restoring the tables to their initial position.

27. Apparatus according to claim 1, comprising at least one saw operating transversely of the line of workpieces and arranged between the supporting tables for dividing the workpieces connected to form a continuous length with the relative movement of the supporting tables, owing to the longitudinal bearing pressure produced thereby, the said saw participating in the common feeding movement of the tables and, after shutting off the longitudinal pressure, is movable during its common feeding movement with the tables into the path of movement of the said length of material and can be returned to its starting position again after making a suitable cut.

28. Apparatus according to claim 27, wherein the transverse saw is arranged below the plane of support of the tables.

29. Apparatus according to claim 27, wherein the transverse saw is movable in a vertical direction into and out of the path of movement of the workpiece.

30. Apparatus according to claim 28, wherein the transverse saw is a circular saw.

31. Apparatus according to claim 27, comprising a workpiece-claimping device fixedly arranged at a location in front of the front supporting table.

32. Apparatus according to claim 1, comprising an abutment serving as a counter-support for the rear end face of the rear workpiece which is arranged on the rear end of the rear supporting table for holding the workpieces when exerting pressure therebetween.

33. Apparatus according to claim 32, wherein the abutment is adjustable longitudinally of the apparatus.

34. Apparatus according to claim 32, wherein the abutment is adapted to be lifted from its holding position for the discharge of the workpieces cut into component lengths by means of the transverse saw.

35. Apparatus according to claim 1, comprising workpiece supports which are displaceable one within the other arranged between the feed device and the front table.

36. Apparatus according to claim 2, wherein the feed device comprises feed rollers for acting on the workpieces.

References Cited

UNITED STATES PATENTS

| | | | |
|---|---|---|---|
| 674,368 | 5/1901 | Fivstbook | 144—3 |
| 689,027 | 12/1901 | Schleicher | 144—3 |
| 1,420,976 | 6/1922 | Dickerson | 144—3 |
| 2,705,981 | 4/1955 | Smith | 144—3 |
| 3,179,135 | 4/1965 | Windson | 144—3 |

FOREIGN PATENTS

| | | |
|---|---|---|
| 542,820 | 1/1932 | Germany. |
| 1,279,684 | 11/1961 | France. |

WILLIAM W. DYER, Jr., *Primary Examiner.*

R. J. ZLOTNIK, *Assistant Examiner.*